March 29, 1927.
L. O. VAN RIPER
AUTOMATIC TIRE GAUGE
Filed Oct. 13, 1922
1,622,688
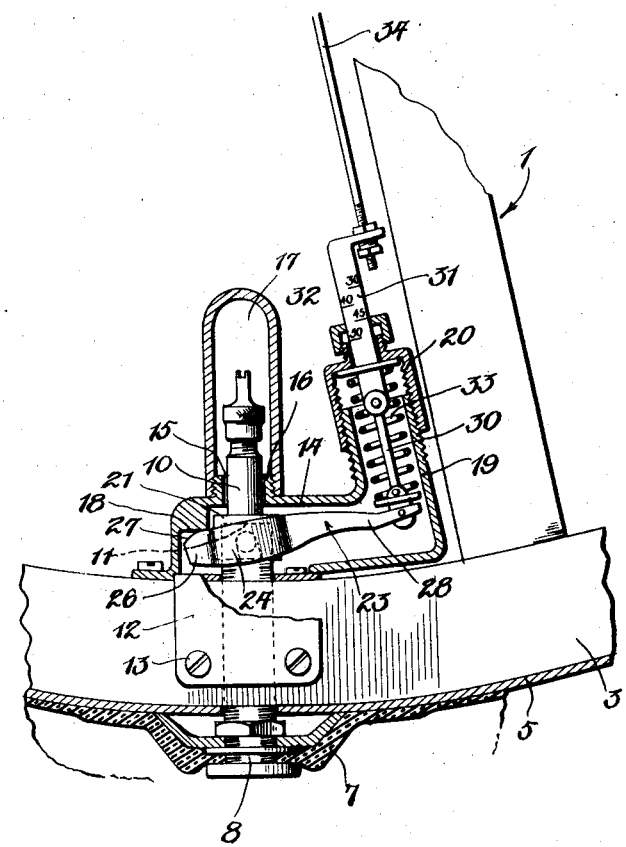
Inventor
Lewis O. Van Riper
By J. P. Gorin
Attorney Patented Mar. 29, 1927.

1,622,688

UNITED STATES PATENT OFFICE.

LEWIS O. VAN RIPER, OF SEATTLE, WASHINGTON.

AUTOMATIC TIRE GAUGE.

Application filed October 13, 1922. Serial No. 594,349.

This invention relates to improvements in tire gauges for motor vehicles and the like, using pneumatic tires.

The invention comprehends the use of a casing mounted on the felly of a wheel of the vehicle and surrounding the valve stem, holding it in radial alignment in the felly and guiding it to permit axial movement thereof under varying air pressures in the tire. The casing contains means for utilizing the axial movement of the valve stem for operating an indicating device for indicating various air pressures in the tire, particularly, low pressures which endanger the life of the tire.

In the drawings:

The figure is a side view of the bottom portion of the wheel showing the housing attached to the felly and associated parts in section on an enlarged scale.

1 indicates the wheel of a motor vehicle having a felly upon which is secured rim 5 carrying a pneumatic tire 6, in which is an inner tube 7 having the usual valve stem 8 extending through the hole 9 in the felly and freely movable therein. The end portion of the valve stem is reduced as indicated at 10 to form the shoulder 11 for a purpose to be described.

A U-shaped clip 12 is formed with an opening in its bottom portion, adapted to receive and guide the valve stem and is mounted on the felly with the end portions secured to opposite sides thereof as indicated at 13. A housing 14 is secured to the felly having an opening to receive the clip 12 and another opening 15 in the upper wall as shown in Fig. 2 for receiving and guiding the reduced end of the valve stem.

The casing has an extension 16 around the opening 15 threaded on the outer surface, which receives the dust cap 17. In the end adjacent the opening which receives the valve stem, the casing is formed with a fulcrum 18 and the opposite end is formed with a lateral tubular extension 19 threaded exteriorly to receive the cap 20. A sleeve 21 is mounted on the valve stem having a recess for receiving the shoulder 11, which limits the movement of the sleeve on the stem. The sleeve is provided with oppositely extending cylindrical bosses 22. A lever 23 is provided with an enlarged portion 24 formed with an opening to receive the sleeve 21 and recesses 25 extending through one edge of the portion 24 to receive the bosses 22, which form a pivotal connection between the lever and valve stem. A short arm 26 of the lever is formed with a curved surface 27 which engages and rocks on the fulcrum in the casing in an obvious manner. The long arm 28 of the lever extends to the end of the casing adjacent the tubular extension 19, and is provided with a slot 29 in the end portion in which is secured a link 30, connected with a gauge rod 31 slidably mounted in the cap 20, which is provided with a packing gland 32. A coil spring 33 normally under compression is mounted in the tubular extension 19, around the link 30 between the cap 20 and lever 23, normally acting to force the long arm of said lever toward the felly and pushing the valve stem outwardly through the felly in an obvious manner.

The gauge rod 31 is provided with a lateral projection to which is adjustably secured a rod 34 designed to extend to and operate in any suitable form of visible indicator.

It will be understood that the pressure of the air in the tire always pushes the valve stem inwardly through the felly toward the hub of the wheel, and in this way will act on the lever 23 to place the coil spring under compression and operate the gauge rod to position it relative to the pressure in the tire.

While this device may be used for indicating the various running pressures of the tires on a vehicle, it is better adapted for indicating a low pressure stage or stages, below which the tires become flattened and are injured by further running or decrease in pressure. This usually results from slow leaks caused by leaky valves or small punctures not ordinarily detectable, and this device is designed to indicate the minimum pressure at which the vehicle may be operated without injury to the tires.

What I claim is:

A tire pressure indicator, including a housing secured to the felly of a wheel and having the valve stem of a pneumatic tire projecting through aligned openings therein, a lever having a pivotal connection with the valve stem and fulcrumed at one end in the housing, a spring interposed between the other end of the lever and the housing normally under compression and acting to push the valve stem outwardly, and indicating means operated by the lever and controlled by the air pressure in the tire through the axial movement of the valve stem for indicating the pressure in the tire.

In testimony whereof I affix my signature.

LEWIS O. VAN RIPER.